Jan. 21, 1930.  L. W. MELCHER  1,744,277
CAR TRUCK
Filed Feb. 1, 1929
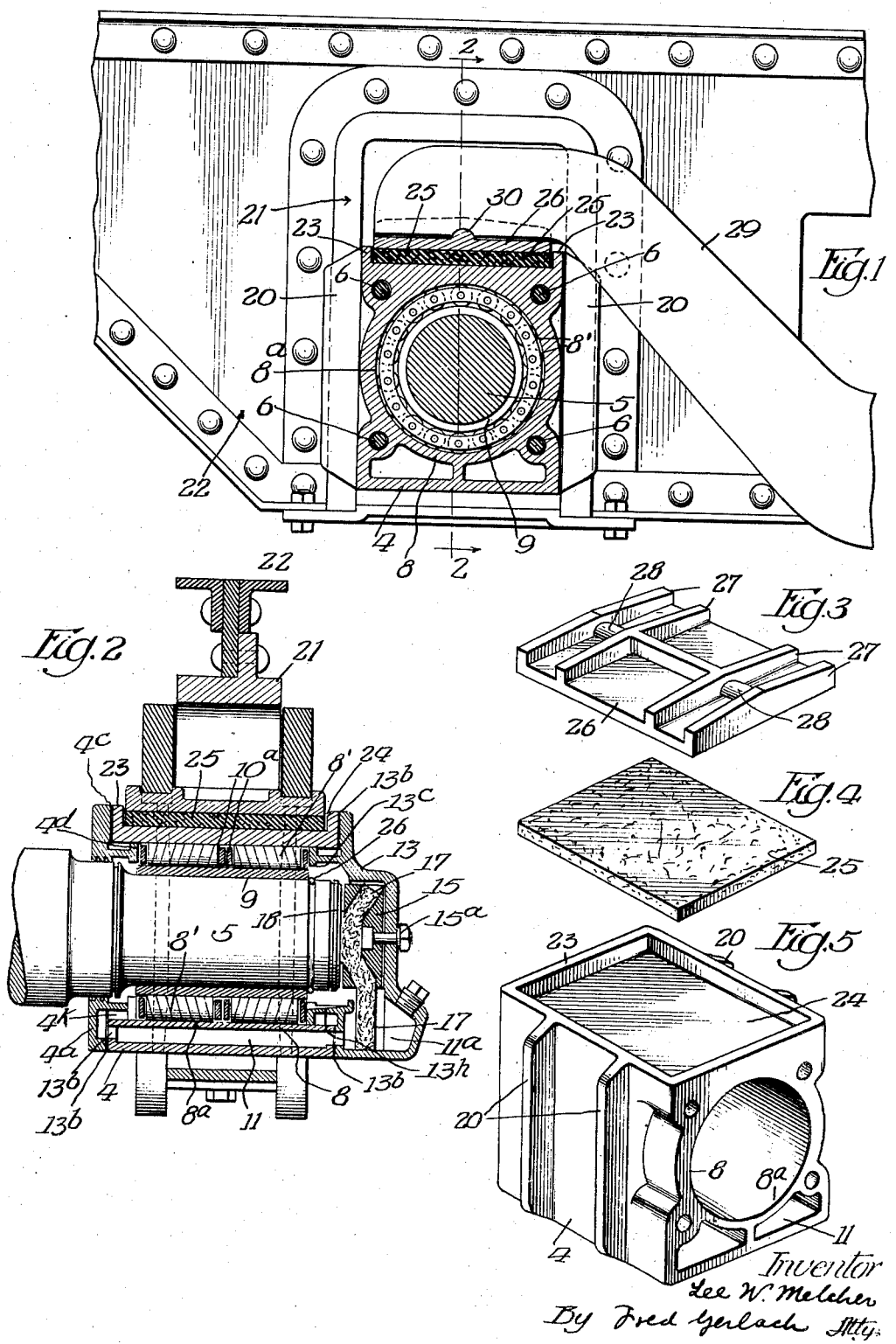
Inventor
Lee W. Melcher
By Fred Gerlach Atty.

Patented Jan. 21, 1930

1,744,277

UNITED STATES PATENT OFFICE

LEE W. MELCHER, OF DE PERE, WISCONSIN

CAR TRUCK

Application filed February 1, 1929. Serial No. 336,873.

The invention relates to car trucks and more particularly to the connection between the equalizer bars and the journal box.

The object of the invention is to provide an improved structure in which insulating means is interposed between the equalizer plate and the journal box to absorb the noises produced in the bearings in the journal box, track, and wheels, and prevent interchange of vibrations between the car and the journal box.

Another object of the invention is to provide means for this purpose which is adapted for use with journal boxes containing roller bearings.

Another object is to provide a cushion which will permit either of a pair of equalizers to yield relatively to the box or to each other.

A still further object of the invention is to provide insulating means for this purpose which can be produced at a low cost, is efficient in operation, and which is adapted to be used with equalizers and equalizer plates of different constructions.

Other objects of the invention will appear from the detailed description.

The invention consists in the several novel features hereinafter set forth and more particularly defined by claims at the conclusion hereof.

In the drawing: Fig. 1 is a longitudinal section through a portion of the truck and journal box embodying the invention. Fig. 2 is a transverse section on line 2—2 of Fig. 1. Fig. 3 is a perspective of the equalizer plate. Fig. 4 is a perspective of the cushion or insulating plate, and Fig. 5 is a perspective of the journal box.

The invention is exemplified with a journal box which comprises a body 4, a ring $4^a$ at the inner end of the body, and a cap 13 at the outer end of the body. An axle 5 extends into the box through ring $4^a$ and terminates inwardly of the cap. Said ring and cap are separately formed from the body and secured thereto by bolts 6 which extend longitudinally through the body and said cap and ring. The upper portion of body 4 is formed of hard metal, and comprises an integral cylindrical wall 8, the inner periphery of which forms a bearing surface $8^a$ for rollers $8'$. An inner race or sleeve 9 is shrunk and fixedly held on the axle. A locking ring 26 for the sleeve 9 is secured in a groove in the axle. The rollers are preferably arranged in two annular or circular series between the outer periphery of sleeve 9 and the inner periphery of wall 8, and constitute a roller bearing for supporting the box from the axle. Each series of rollers is confined in a suitable cage $10^a$. A gasket $4^c$ is clamped between the inner end of the box-body 4 and ring $4^a$, and a gasket $13^b$ is clamped between cap 13 and the outer end of the box-body 4 to form oil-tight joints between them. Ring $4^a$ has an inwardly extending portion $4^d$, and cap 13 has an inwardly extending portion $13^c$ between which the rollers are confined longitudinally. A thrust block 15 is secured in cap 13 by a bolt $15^a$. Thrust block 15 carries a vertically extending wick 17, and has its inner face formed with an opening 18 to expose the portion of the wick adjacent the central portion of the end face of the axle and to apply lubricant thereto. The oil applied to the axle will be thrown outwardly by centrifugal force. The lower end of the wick extends into a chamber 11 in the lower portion of cap 13 to continuously feed oil by capillary attraction to the axle. Chamber $11^a$ communicates with an oil-well 11 in the box body. Portion $13^c$ of cap 13 catches the oil thrown outwardly by centrifugal force, and has a recess $13^h$ in its lower portion to conduct the oil to the outer end of bearing face $8^a$ and the space in which the rollers travel, so that it will be carried around all portions of the bearing face $8^a$ and the outer periphery of the sleeve 9. From the inner end of bearing face $8^a$, the oil passes through a duct $4^k$ and into the rear end of the oil well.

The box is formed with vertically extending pedestal guides 20 to fit around and slidably connect the journal box to the pedestal 21 which is secured to the wheel-piece 22 of the truck frame.

The top of the box is formed with a marginal rib 23 which forms a rectangular pocket 24, in which fits a plate 25 of insulating material, so that the plate will be retained on the top of the body of the box. An equalizer plate 26 fits and bears on the top of plate 25, and is also confined in the pocket 24. This plate is formed with two pairs of transverse ribs 27 adjacent the inner and outer ends of the box, and equalizer seats 28 are integrally formed with the plate and extend between said pairs of ribs. A pair of equalizer bars 29 are provided with female seats 30 to engage the male seats 28 on the plate 26 which is usually made of cast steel. The equalizer bars are confined between the ribs 27 and are connected to the truck frame in such manner that the weight of the car will be applied to them through springs, as well understood in the art. In practice, the resilient plate 25 is made of compressed ground cork of the thickness approximating three quarters of an inch and of such density that it will compress approximately one-eighth of an inch under a load of approximately 500 pounds to the inch. The plate 25 extends over substantially the entire area of the top of the box, so that it will have sufficient capacity to effectively cushion the load upon it.

The resilient plate 25 acts as a cushion to insulate the truck and track noises and vibration from the car, and also serves in a measure as an equalizing element between the equalizer plate and bars of a journal box which will distribute the load over the entire bearing in event the pressure in operation is not equally distributed on the equalizer bar or is unevenly distributed on the equalizers of a pair of bars engaging one of the equalizer plates.

The invention exemplifies a car truck in which a resilient plate is interposed between the equalizer plate and the journal box which will effectively insulate the truck noises and vibration from the car, particularly when the journal boxes are equipped with roller bearings. The invention also exemplifies a cushion plate which extends substantially over the entire top of the journal box, and is confined in a pocket formed by integral ribs on the box, so that the invention may be applied to car trucks at a low cost. This pocket also serves to hold the plate with the equalizer seat on the cushion plate. The construction is simple, and is adapted to be applied to equalizers of standard construction. The cushion plate is adapted to be used with different equalizer plates.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a car truck the combination of a pedestal, a journal box vertically movable in the pedestal and having a wall on its top, a plate of resilient material seated on said wall, an equalizer-plate on said resilient plate, and an equalizer-bar engaging the equalizer-plate.

2. In a car truck, the combination of a pedestal, a journal box vertically movable in the pedestal and having a wall on its top, a plate of compressed resilient material seated on said wall, an equalizer-plate on said resilient plate, and an equalizer-bar engaging the equalizer-plate.

3. In a car truck, the combination of a pedestal of a journal box, vertically movable in the pedestal, and having a seat formed on the top thereof, a plate of resilient material fitting on said seat, an equalizer-plate on said resilient plate, and an equalizer-bar engaging the equalizer-plate.

4. In a car truck, the combination of a pedestal, a journal box vertically movable in the pedestal and having a substantially flat seat formed on and extending over substantially its entire top, a substantially flat plate of resilient material held on said seat, an equalizer-plate on said resilient plate, and an equalizer-bar engaging the equalizer-plate.

5. In a car truck, the combination of a pedestal, a journal-box slidable in the pedestal and provided with a seat on the top thereof, a roller-bearing for an axle in the box, a plate of resilient material fitting on said seat, an equalizer-plate on said resilient plate, and an equalizer-bar engaging the equalizer-plate.

6. In a car truck, the combination of a pedestal, a journal box slidable in the pedestal and provided with a seat extending over substantially its entire top, a roller-bearing for an axle in the box, a substantially flat plate of resilient material fitting on said seat, an equalizer-plate on said resilient plate, and an equalizer-bar engaging the equalizer-plate.

7. In a car truck, the combination of a pedestal, a journal box slidably mounted in the pedestal, having a seat on its top, and a marginal rib around the seat to form a pocket, a plate of resilient material on the seat and in the pocket, an equalizer-plate on the resilient plate, and an equalizer-bar engaging the equalizer-plate.

8. In a car truck, the combination of a pedestal, a journal box slidably mounted in the pedestal, having a seat on its top and a marginal rib around the seat to form a pocket, a plate of resilient material on the seat and in the pocket, a roller-bearing in the box, and an equalizer-plate on the resilient plate, and an equalizer-bar engaging the equalizer-plate.

Signed at De Pere, Wisconsin, this 28th day of January, 1929.

LEE W. MELCHER.